US010268713B2

(12) United States Patent
Kasravi et al.

(10) Patent No.: US 10,268,713 B2
(45) Date of Patent: Apr. 23, 2019

(54) FEDERATED SOCIAL MEDIA ANALYSIS SYSTEM AND METHOD THEREOF

(71) Applicant: ENT. SERVICES DEVELOPMENT CORPORATION LP, Houston, TX (US)

(72) Inventors: Kas Kasravi, W. Bloomfield, MI (US); Kieran Mccorry, Belfast (GB)

(73) Assignee: ENT. SERVICES DEVELOPMENT CORPORATION LP, Houston, TX (US)

( * ) Notice: Subject to any disclaimer, the term of this patent is extended or adjusted under 35 U.S.C. 154(b) by 231 days.

(21) Appl. No.: 14/759,959

(22) PCT Filed: Feb. 26, 2013

(86) PCT No.: PCT/US2013/027727
§ 371 (c)(1),
(2) Date: Jul. 9, 2015

(87) PCT Pub. No.: WO2014/133479
PCT Pub. Date: Sep. 4, 2014

(65) Prior Publication Data
US 2015/0356126 A1   Dec. 10, 2015

(51) Int. Cl.
*G06F 7/00* (2006.01)
*G06F 17/30* (2006.01)
(Continued)

(52) U.S. Cl.
CPC .. *G06F 17/30321* (2013.01); *G06F 17/30477* (2013.01); *G06F 17/30867* (2013.01);
(Continued)

(58) Field of Classification Search
None
See application file for complete search history.

(56) References Cited

U.S. PATENT DOCUMENTS

| 7,974,983 B2 | 7/2011 | Goeldi |
| 2005/0208950 A1 | 9/2005 | Hasse |

(Continued)

FOREIGN PATENT DOCUMENTS

| CN | 101981590 A | 2/2011 |
| WO | WO-2012150602 | 11/2011 |

OTHER PUBLICATIONS

Nori, N., et al.; "Exploiting User Interest on Social Media for Aggregating Diverse Data and Predicting Interest"; Nov. 22, 2011; 8 pages.
(Continued)

*Primary Examiner* — Tuan A Pham
(74) *Attorney, Agent, or Firm* — Sheppard Mullin Richter & Hampton LLP (57) ABSTRACT

Embodiments of the present invention disclose a system and method for federated social media analysis. According to one embodiment, aggregating social data from a plurality of social media sources is aggregated and stored in a federated social media database. The aggregated social data is then analyzed to determine content correlations. Furthermore, an application interface is provided for accessing the content correlations associated with the aggregated social media data.

19 Claims, 5 Drawing Sheets

(51) Int. Cl.
*G06Q 10/10* (2012.01)
*G06Q 30/02* (2012.01)
*G06Q 50/00* (2012.01)

(52) U.S. Cl.
CPC ......... *G06Q 10/10* (2013.01); *G06Q 30/0269* (2013.01); *G06Q 50/01* (2013.01)

(56) References Cited

U.S. PATENT DOCUMENTS

| | | | |
|---|---|---|---|
| 2006/0025127 A1 | 2/2006 | Cromer | |
| 2008/0005073 A1* | 1/2008 | Meek | G06F 17/30867 |
| 2008/0294663 A1 | 11/2008 | Heinley | |
| 2009/0249451 A1 | 10/2009 | Su et al. | |
| 2010/0114788 A1* | 5/2010 | White | G06Q 50/01 |
| | | | 705/319 |
| 2010/0119053 A1 | 5/2010 | Goeldi | |
| 2010/0121849 A1* | 5/2010 | Goeldi | G06Q 10/00 |
| | | | 707/736 |
| 2010/0257131 A1 | 10/2010 | Kim et al. | |
| 2011/0184886 A1* | 7/2011 | Shoham | G06Q 30/02 |
| | | | 705/400 |
| 2011/0307474 A1* | 12/2011 | Hom | G06F 17/30545 |
| | | | 707/723 |
| 2012/0014353 A1 | 1/2012 | Marinier | |
| 2012/0124134 A1* | 5/2012 | Dey | G06Q 10/10 |
| | | | 709/204 |
| 2012/0136723 A1 | 5/2012 | Larner et al. | |
| 2012/0179573 A1* | 7/2012 | Falcone | G06Q 30/0601 |
| | | | 705/26.8 |
| 2012/0185474 A1 | 7/2012 | Hansen et al. | |
| 2012/0233212 A1* | 9/2012 | Newton | G06Q 30/02 |
| | | | 707/774 |
| 2013/0019009 A1 | 1/2013 | Tremblay et al. | |
| 2013/0031475 A1* | 1/2013 | Maor | G06Q 10/10 |
| | | | 715/706 |
| 2014/0033074 A1* | 1/2014 | Thibaux | G06F 17/30867 |
| | | | 715/753 |

OTHER PUBLICATIONS

PCT; "Notification of Transmittal of the International Search Report and the Written Opinion of the International Searching Authority, or the Declaration"; cited in PCT/US2013/027727, dated Nov. 27, 2013; 11 pages.

EPO Search Report; 13876278.6-1955/2962213 PCT/US2013/027727; dated Aug. 22, 2016; 8 pages.

\* cited by examiner

FEDERATED SOCIAL MEDIA ANALYSIS SYSTEM AND METHOD THEREOF

BACKGROUND

The concept of social media—and the idea of having a strong social media presence—has gained significant popularity in recent years. Multiple modalities of social media have been introduced that address capabilities such as communications, collaboration, messaging, photo and video sharing, and location services. Moreover, multiple media sources and tools are available with each specializing in particular aspects of social interactions, within different formats, and with varying content. In many instances, individuals maintain a presence via multiple social media sources and tools and interact with each accordingly.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which.

DETAILED DESCRIPTION OF THE INVENTION

The following discussion is directed to various embodiments. Although one or more of these embodiments may be discussed in detail, the embodiments disclosed should not be interpreted, or otherwise used, as limiting the scope of the disclosure, including the claims, In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure, The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

The explosion of different modalities of social media has provided a rich source for capturing and leveraging timely and in-depth insights about people and events. Examples of such media and social networking websites include Facebook, FourSquare, Twitter, Ning, Virneo, YouTube, SnapFish, Flikr, Instagram, and Google+, amongst others. In addition, social media is entering business environment either via adoption of the above media, or tools specialized for enterprises, such as Yammer, Jive, tibbr, and SharePoint. The aggregation of the above referenced social media interactions (i.e., federated social media) yields a rich and unprecedented source of real-time information about individuals and events. This information streams in at a rapid rate, in multiple formats, and in extremely large volumes, leading to a Big Data characterization (i.e., massively large amounts of data, in multiple formats, that are continuously streamed, and subject to real-time analysis). Big Data in federated social media is too massive for human comprehension, yet contains extremely useful information for many use cases (e.g., advertising, journal creation). Prior approaches to analysis of social media have been mostly limited to analyzing the content of a single social medium; such as Facebook analyzing its members' behaviors for advertising placement. Therefore, there is a need in the art to more effectively and rapidly analyze the Big Data in federated social media and make this information available to a variety of use cases.

Examples of the present invention disclose a method and system for providing analysis of federated social media. According to one example, social media data is aggregated from multiple media sources. In-depth analysis is performed on the aggregated data to provide content correlations and associations for pattern detection. For instance, associations of sentiments (via Twitter), with friends (Facebook), along with pictures (Snapfish), and location (FourSquare), may be used to infer previously unknown patterns. That is, examples of the present invention are able to harvest deep insights from federated social media using analytics and provide these insights for use by various third-party applications.

Figure 1:
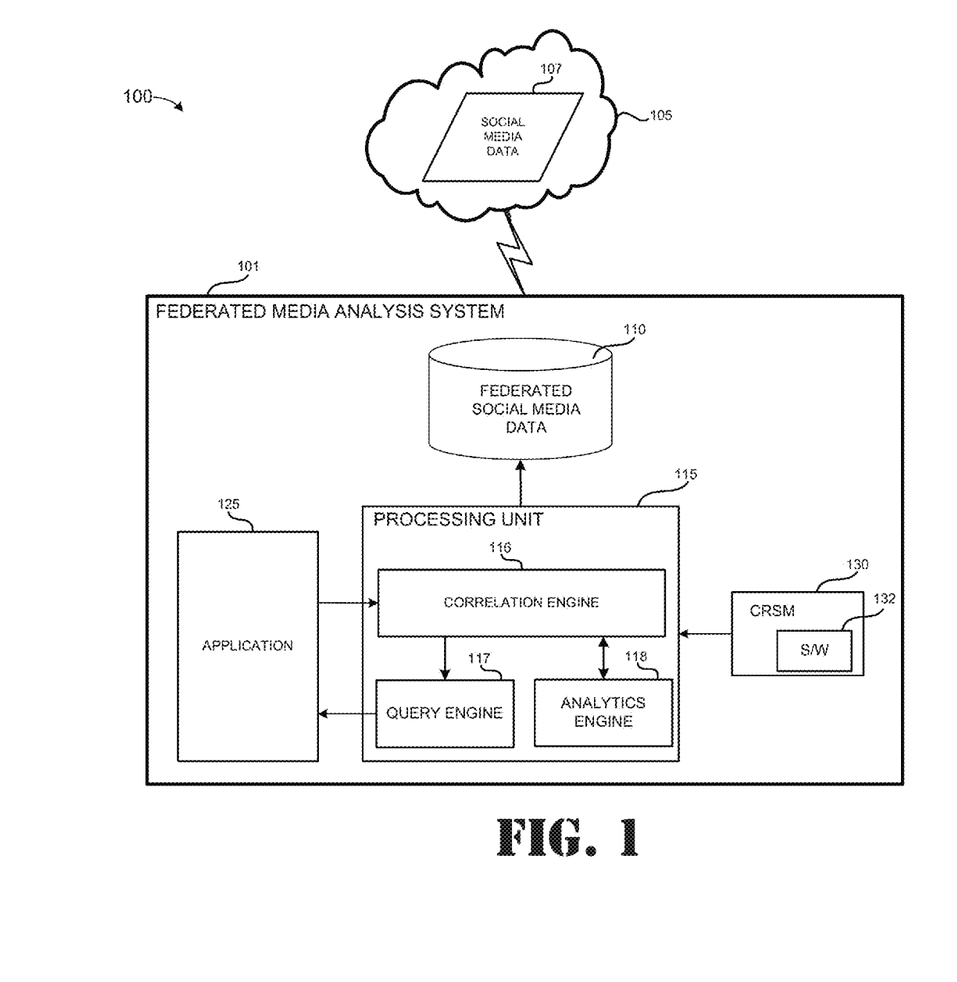
FIG. 1 is a simplified block diagram of a federated social media analysis system according to an example of the present invention.

Referring now in more detail to the drawings in which like numerals identify corresponding parts throughout the views. FIG. 1 is a simplified block diagram of a federated social media analysis system according to an example of the present invention. As shown in this example, the system 100 includes social media network 105, which includes social media data 107, and a federated social media analysis (FSMA) system 101. The network 105 represents multiple social media data sources such as those described above, and included social media data 107 associated with individuals, events, and locations for example. The federated media analysis system includes a federated social media database 110, a processing unit 115, application 125, and a computer-readable storage medium 130. In one embodiment, processing unit 115 represents a central processing unit (CPU), microcontroller, microprocessor, or logic configured to execute programming instructions associated with the federated media analysis system 101. The correlation engine 116 and analytics engine 118 are utilized to provide deep insights and glean associations from the content within the federated social media database 110. The query engine 117 is utilized by a third party application 125 to provide a particular use case as configured by the application 125 or operating user for example. Storage medium 130 represents volatile storage (e.g. random access memory), non-volatile store (e.g. hard disk drive, read-only memory, compact disc read only memory, flash storage, etc.), or combinations thereof. Furthermore, storage medium 130 includes software 132 that is executable by processor 115 and, that when executed, causes the processor 115 to perform some or all of the functionality described herein. For example, the correlation engine 117 and analytics engine 118 may be implemented as executable software within the storage medium 130. Through effective aggregation and analysis of federated social media, facts, patterns, trends, and other insights can be gained that can support a wide variety of use cases.

Figure 2:
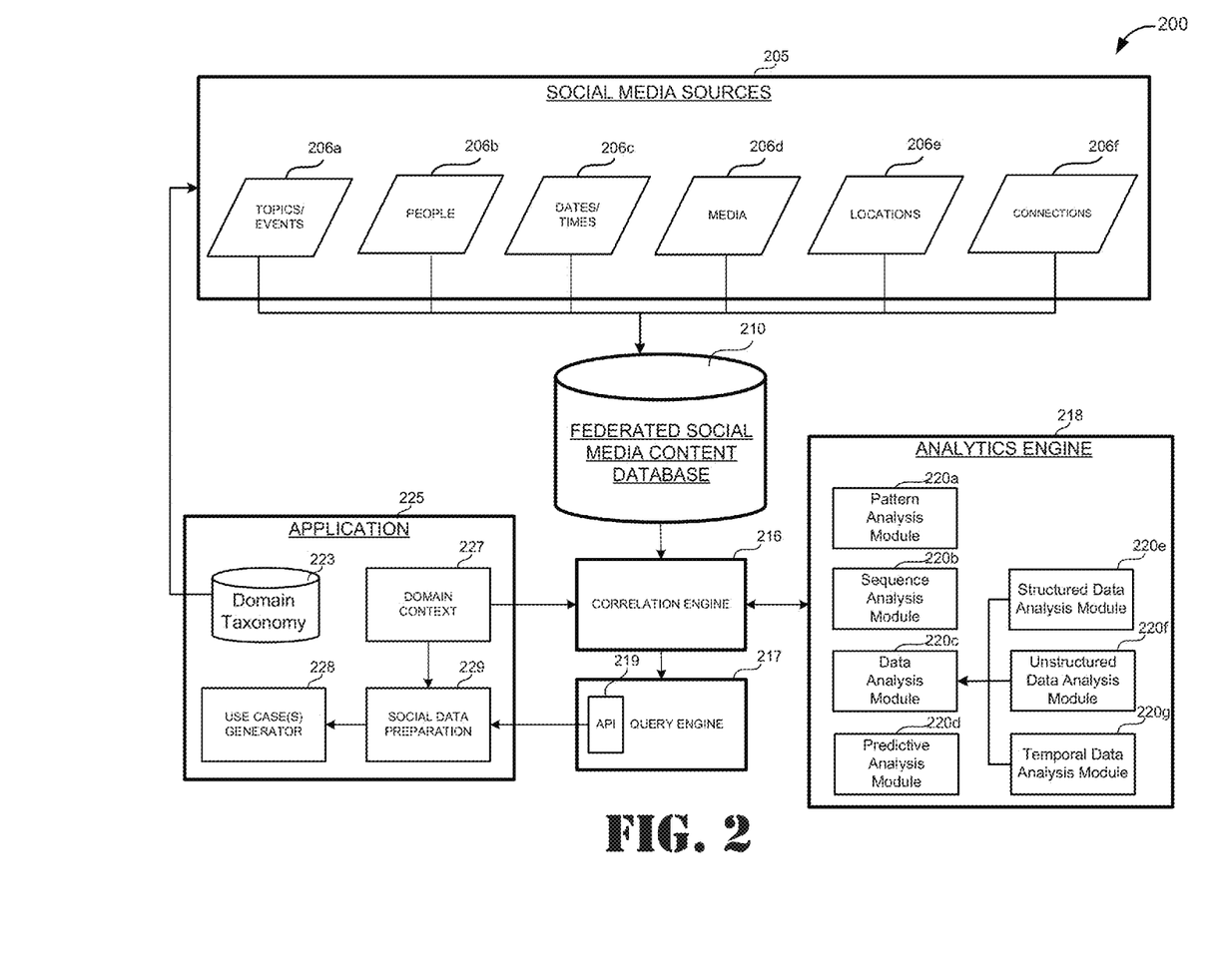
FIG. 2 is another block diagram of a federated social media analysis system according to an example of the present invention.

FIG. 2 is another block diagram of a federated social media analysis system according to an example of the present invention. In one example embodiment, the system 200 continuously accesses multiple social media sources 205 (e.g., via opt-in or accessing publicly available information) to access data related to topics/events 206a, people 206b, dates/times 206c, media 206d, locations 206e, and/or connections 206f. However, these data sets are not exhaustive and examples of the present invention may utilize any available information from media sources that is conducive to analysis and provide additional insight. The data collected from the social media sources 205 is then stored in the Federated Social Media Content database 210. According to one example, the data is indexed to maintain the fidelity of the associations among topics/events 206a, people 206b, data/times 206c, media 206d, and locations 206e for example. For example, in combination, it will be possible to associate an individual's travel activities such as dates of travel, locations visited, pictures taken at each location, identification of friends/family on trip, locations visited, and the like. The correlation engine 216 is configured to analyze the federated social media content for rich and hidden insights via the capabilities provided in the analytics engine 218, which may include searching for associations, correlations, sequences, sentiments, and events. The query engine 217 and application programming interface 219 represent a vehicle to provide access to the insights discovered by the correlation engine 216 and supports any third-party application that could benefit from the insights. More particularly, the query engine 217 is configured to process data and return requested information, while the application programming interface (API) 219 provides the necessary subroutine calls to external applications (e.g., application 225). That is, the output (relevant content) of the query engine 217 is accessible to external application 225 via the API 219 and thus allows many diverse applications to benefit from the analysis of social media.

In accordance with one example embodiment, the analytics engine 218 comprises of multiple analytical techniques for providing deep insights from the federated data including pattern recognition (via pattern analysis module 220a), sequence analysis (via sequence analysis module 220b), and predictive modeling (via predictive analysis module 220d) for example. Furthermore, the data analysis module 220c is configured to provide data analysis of structured data (via structured data analysis module 220e), unstructured data (via unstructured data analysis module 220f), and temporal data (temporal data analysis module 220g). Moreover, application 225 represents any third-party application that can leverage the insights gained through federated social media analysis described herein and includes a domain taxonomy 223, domain context 227, use case generator 228, and social data preparation module 229. In particular, application 225 includes a domain taxonomy 223, which defines the lexicon and hierarchy associated with the specific application. The domain context 227 defines content that is important and relevant in the application and of interest to the users. Still further, use case generator 228 represents the specific service provided by the application 225 to the user (e.g., photo journal of recent trip). The social data preparation module 229 interfaces with the API 219 and adapts the insights to a form/format useable by the application 225. The nature of the analysis will depend on the type of data available, and the analysis of the social media data is performed to the extent feasible. In one example, the analysis is performed via Big Data fast queries and embedded analytics, although this function can also be performed via conventional analytics and stored in a database for subsequent use.

Figure 3:
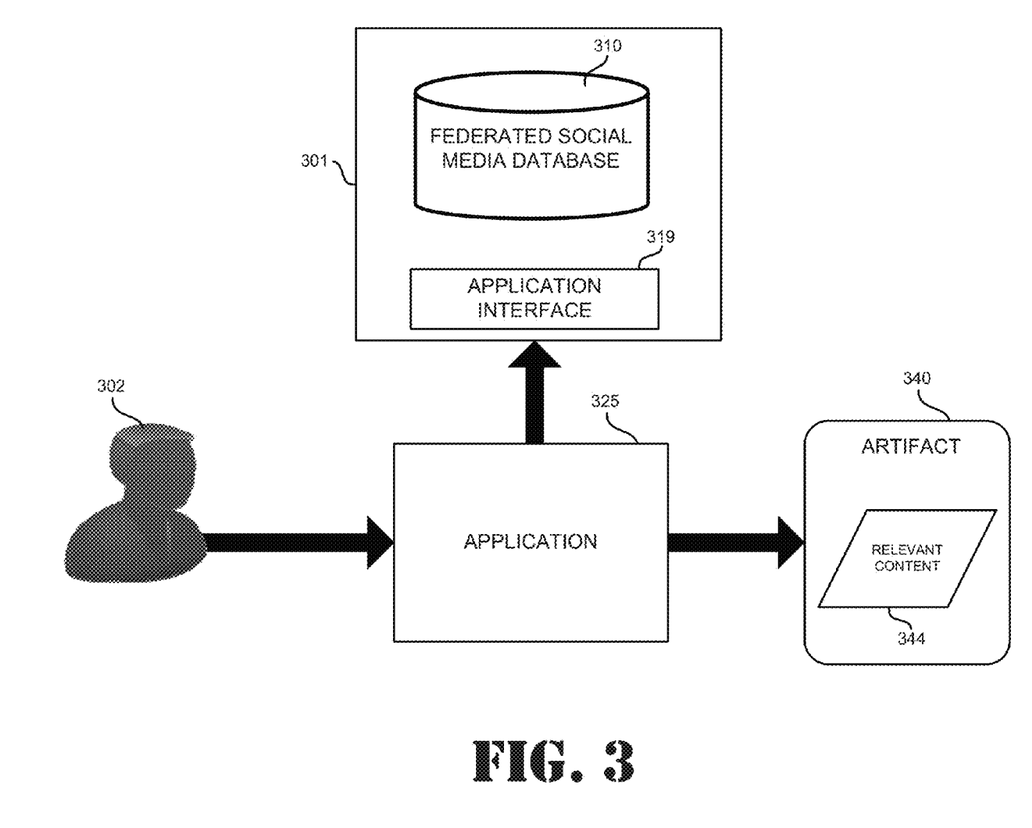
FIG. 3 illustrates an artifact creation scenario employing the federated social media analysis system according to an example of the present invention.

FIG. 3 illustrates an artifact creation scenario employing the federated social media analysis system according to an example of the present invention. As shown here, an operating user 302 interacts and submits a query request via a third-party application 325. For example, the user may seek the creation of a user experience memory artifact 340 that aggregates social media information from multiple sources to create a single, comprehensive description of a user experience or set of experiences. As used herein, artifacts 340 may include relevant content 344 associated with personal and/or business use cases such as: accurate advertising, market analysis, event detection, automated personal journal creation, automated photo album or video library generation, surveillance, or monitoring services for example. That is, the example embodiments aim to provide a solution that leverages the knowledge that can be inferred from aggregated federated social media sources and enable the availability of this information to a broad set of applications. Additionally, the system described herein includes a mechanism for providing federated, controlled access to content from other specified users of the application. The user 302 may be able to configure the extent to which content from other users may be included in the production of an artifact 340. Furthermore, the user may specify preferences for various social media or other services to be referenced during the production of an artifact (e.g., use Twitter and Instagram, but not Facebook) as well as the level of detail to be included (e.g., include my status comments, but not those of others; incorporate summary content from Wikipedia, but do not include detailed descriptions).

In one example scenario, the user query request may include a selected time period for which a user experience artifact (e.g., a photo album) is to be created. In response, the query engine 317 utilizes the various social media sources at its disposal (e.g., Twitter, Facebook, photographic images, etc.) and associated with the federated database 325 with respect to the stated time period, correlate the information (based on location, time, etc.) using the correlation engine, and create the artifact 340 using known design and production techniques as appreciated by one skilled in the art. The artifact 340 may include photographic images taken by the user, images of the location taken by others, complementary descriptive or factual information about the location, metadata describing when the user was at the location, information about the location, who was present with the user, content shared by the user in relation to the location (e.g., tweets, status updates), and the like.

For example, a user visits Paris for a weekend with friends. While there, the friends visit tourist attractions, restaurants, take photographs, submit Facebook status updates about their trip, tweet about their trip, check in at attractions, etc. After the trip, a user of the FSMA system specifies the start and end time for which the user experience artifact 340 is to be created. The system is configured to collates all relevant content taken by the user, as well as content from the user's friends (where access is specified and allowed), complementary information on some of the locations visited (e.g., content from Wikipedia about the Eiffel Tower), etc., and create a user experience artifact 340 about the trip, which is essentially a memento of relevant content 344 the trip. The artifact 340 and relevant content 344 can be shared between the friends, either as a website using an electronic representation, or as a hardcopy gift.

Figure 4:
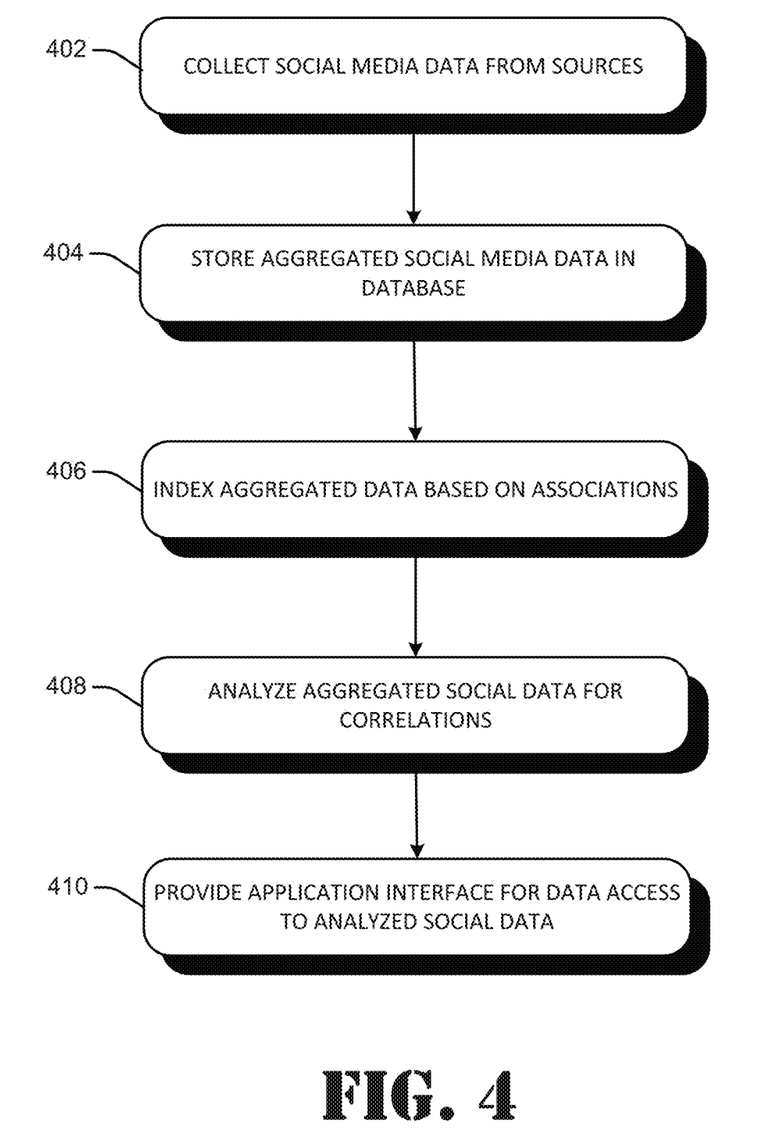
FIG. 4 is a flow chart of the processing steps for providing federated social media analysis according to an example of the present invention.

FIG. 4 is a flow chart of the processing steps for providing federated social media analysis according to an example of the present invention. In step 402, the social media data is collected from a multiple social media sources (e.g., Facebook, Twitter, Google+, etc.). Thereafter, in step 404, the aggregated social media data is stored in the federated social media database as described above. In one example, the social media data is continuously collected from the social media sources, aggregated and stored in real-time. In step 406, the aggregated data is indexed base associations between people, topics, locations, and/or time for example. Next, in step 408, the aggregated social media date is analyzed for content correlations and associations via the correlations engine and analytics engine. Lastly, in step 410, an application programming interface (API) is provided by the system so as to enable data access from third-party applications to the analyzed social media data. More particularly, the system is configured to publish an API as will be appreciated by one in the art so as to create an open architecture for sharing content between FSMA system and any external applications.

Figure 5:
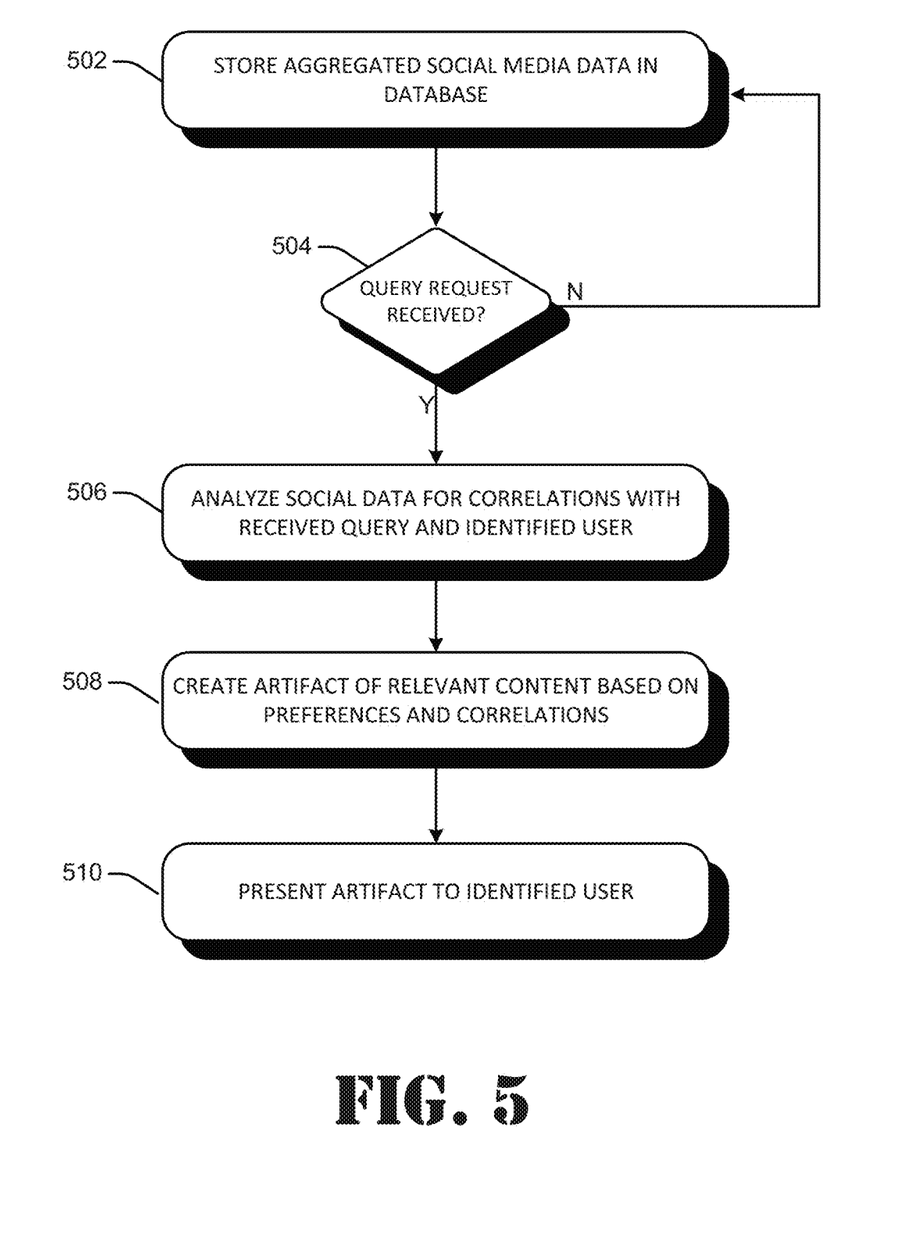
FIG. 5 is a flow chart of the processing steps for providing federated social media analysis based on a user query according to an example of the present invention.

FIG. 5 is a flow chart of the processing steps for providing federated social media analysis based on a user query according to an example of the present invention. In step 502, the aggregated social media data is stored in the federated social media database. If a query request is received from the user in step 504, then the aggregated social media data is analyzed for correlations with the received query and the identified user. For example, a user may select a set of photographs and request that a user memory experience artifact is created based on the photographs. The FSMA system may automatically identify where and when the photographs were taken (e.g., based on metadata tags associated with the photographs) or request such information from the user. That is, the FSMA system described herein may operate in a responsive fashion (Le., the user requests the creation of an artifact and the other parts of the system are employed to perform the correlation and aggregation on demand) or dynamically in real-time. In step 506, the FSMA system utilizes the query engine/API and correlation engine to identify relevant content from the various social media sources (e.g., Twitter, Facebook, Foursquare, Wikipedia, etc.) by correlating information based on location and time, and including relevant content from 'friends' or contacts associated with the operating user. In step 507, an artifact of relevant content is created based on the preferences of the user and the identified correlations returned form the correlation and analytics engine.

Embodiments of the present invention provide a system and method for aggregating information from multiple social media sources, performing real-time analysis of the information in search of hidden insights and facts, and providing the outcome to other applications for specific use cases. Moreover, many advantages are afforded by the federated social media analysis system in accordance with the example embodiments. For instance, the present system allows for real-time access to a richer source of information suitable for inferring patterns and facts that may drive the market. Furthermore, multiple applications can be enabled by leveraging the insights extracted from federated social media.

Furthermore, while the invention has been described with respect to exemplary embodiments, one skilled in the art will recognize that numerous modifications are possible. Moreover, not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments, Additionally, the arrangement o order of elements or other features illustrated in the drawings or described herein need not be arranged in the particular way illustrated and described. Many other arrangements are possible according to some embodiments.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:
1. A computer-implemented method comprising:
aggregating, by a computing device, computerized social networking content items from a plurality of computerized social networking sources;
receiving, by the computing device, a user request to create, based on a user-selected first one of the computerized social networking content items, an experience album;
identifying, by the computing device, a parameter from the first one of the aggregated computerized social networking content items, the parameter specifying date data associated with the first one of the aggregated computerized social networking content items or location data indicating a location associated with the user-selected first one of the aggregated computerized social networking content items;
identifying, by the computing device, at least a second one of the plurality of the aggregated computerized social networking content items based on the identified parameter; and
collating, by the computing device, the first one of the aggregated computerized social networking content items and the identified second one of the aggregated computerized social networking content items into the experience album;
wherein the user request is received from a first user and the second one of the aggregated computerized social networking content items is posted to one or more of the plurality of computerized social networking sources by a second user different from the first user; and wherein identifying the second one of the aggregated computerized social networking content items comprises:
   obtaining contacts associated with the first user, the contacts including the second user, and
   identifying a subset of the aggregated computerized social networking content items that is associated with the second user, wherein the second one of the aggregated computerized social networking content items is identified from among the subset of the aggregated computerized social networking content items.

2. The computer-implemented method of claim 1, further comprising:
   indexing, by the computing device, the aggregated computerized social networking content items based on an association between one or more of people, topics, locations, or time.

3. The computer-implemented method of claim 1, further comprising:
   receiving, by the computing device, a user query request; and
   analyzing, by the computing device, the aggregated computerized social networking content items for content correlations between the received user query request and operating user data.

4. The computer-implemented method of claim 1, wherein content correlations are utilized by a third party application to provide an artifact of relevant content.

5. The computer-implemented method of claim 4, wherein the artifact of relevant content is based on user preferences of desired content and content correlations associated with a received query.

6. The computer-implemented method of claim 1, wherein the computerized social networking content items include one or more of photographic images, videos, comments, or blogs associated with an event, person, or place.

7. The computer-implemented method of claim 1, further comprising:
   performing, by the computing device, one or more of pattern recognition, sequence analysis, or predictive modeling.

8. The computer-implemented method of claim 1, wherein the aggregated computerized social networking content items are analyzed in real-time.

9. The computer-implemented method of claim 1, further comprising:
   storing, by the computing device, the aggregated computerized social networking content items in a federated computerized social networking database, wherein the first one of the aggregated computerized social networking content items and the identified second one of the aggregated computerized social networking content items into the experience album from the federated computerized social networking database.

10. The computer-implemented method of claim 1, wherein identifying the parameter comprises:
    reading metadata associated with the first one of the computerized social networking content items to obtain the parameter.

11. The computer-implemented method of claim 1, wherein the user request is received from a first user and wherein identifying the parameter comprises:
    obtaining the parameter from the first user.

12. A system comprising:
    a processor; and
    a memory storing instructions that, when executed by the at least one processor, cause the system to:
       aggregate computerized social networking content items from a plurality of computerized social networking sources;
       receive a user request to create, based on a user-selected first one of the computerized social networking content items, an experience album;
       identify a parameter from the first one of the aggregated computerized social networking content items, the parameter specifying date data or location data indicating a location associated with the user-selected first one of the aggregated computerized social networking content items;
       identify at least a second one of the plurality of the aggregated computerized social networking content items based on the identified parameter; and
       collate the first one of the aggregated computerized social networking content items and the identified second one of the aggregated computerized social networking content items into the experience album;
    wherein the user request is received from a first user and the second one of the aggregated computerized social networking content items is posted to one or more of the plurality of computerized social networking sources by a second user different from the first user; and
    wherein the instructions that, when executed by the processor, cause the system to identify the second one of the aggregated computerized social networking content items comprise instructions that, when executed by the processor, cause the system to:
       obtain contacts associated with the first user, the contacts including the second user, and
       identify a subset of the aggregated computerized social networking content items that is associated with the second user, wherein the second one of the aggregated computerized social networking content items is identified from among the subset of the aggregated computerized social networking content items.

13. The system of claim 12, wherein:
    the aggregated computerized social networking content items are analyzed in real-time.

14. The system of claim 12, wherein content correlations are utilized by a third party application to provide an artifact of relevant content.

15. The system of claim 14, wherein the artifact of relevant content is based on user preferences of desired content and content correlations associated with a received query.

16. The system of claim 12, wherein the computerized social networking content items include one or more of photographic images, videos, comments, or blogs associated with an event, person, or place.

17. The system of claim 12, wherein the instructions, when executed by the processor, further cause the system to perform one or more of pattern recognition, sequence analysis, or predictive modeling.

18. A non-transitory computer readable storage medium having stored executable instructions, that when executed by a processor, cause the processor to:
    aggregate computerized social networking content items from a plurality of computerized social networking sources;
    receive a user request to create, based on a user-selected first one of the computerized social networking content items, an experience album;

identify a parameter from the first one of the aggregated computerized social networking content items, the parameter specifying date data or location data indicating a location associated with the user-selected first one of the aggregated computerized social networking content items;

identify at least a second one of the plurality of the aggregated computerized social networking content items based on the identified parameter; and collate the first one of the aggregated computerized social networking content items and the identified second one of the aggregated computerized social networking content items into the experience album;

wherein the user request is received from a first user and the second one of the aggregated computerized social networking content items is posted to one or more of the plurality of computerized social networking sources by a second user different from the first user; and wherein the instructions that, when executed by the processor, cause the system to identify the second one of the aggregated computerized social networking content items comprise instructions that, when executed by the processor, cause the system to:

obtain contacts associated with the first user, the contacts including the second user, and identify a subset of the aggregated computerized social networking content items that is associated with the second user, wherein the second one of the aggregated computerized social networking content items is identified from among the subset of the aggregated computerized social networking content items.

19. The computer-implemented method of claim 18, wherein the first one of the aggregated computerized social networking content items is posted to one or more of the plurality of computerized social networking sources by the first user.

* * * * *